United States Patent [19]

Weisglass

[11] 3,892,482
[45] July 1, 1975

[54] COLOR CORRECTING ILLUMINATION SYSTEM FOR COLOR ENLARGERS AND THE LIKE

[75] Inventor: Louis L. Weisglass, New York, N.Y.

[73] Assignee: Berkey Photo, Inc., New York, N.Y.

[22] Filed: Mar. 7, 1974

[21] Appl. No.: 448,912

[52] U.S. Cl. .................................. 355/35; 355/71
[51] Int. Cl. .......................................... G03b 27/76
[58] Field of Search ............ 355/35, 37, 67, 70, 71

[56] References Cited
UNITED STATES PATENTS

| | | | |
|---|---|---|---|
| 2,794,365 | 6/1957 | Baasner et al. | 355/35 |
| 3,049,051 | 8/1962 | Debrie | 355/35 X |
| 3,273,451 | 9/1966 | Wilson | 355/35 X |
| 3,451,753 | 6/1969 | Bures | 355/71 X |
| 3,458,254 | 7/1969 | Aston | 355/35 |
| 3,469,914 | 9/1969 | Thomson | 355/35 X |
| 3,492,070 | 1/1970 | Zahn | 355/37 |
| 3,630,609 | 12/1971 | Clapp et al. | 355/37 |

*Primary Examiner*—Richard A. Wintercorn
*Attorney, Agent, or Firm*—Toren, McGeady and Stanger

[57] ABSTRACT

In the apparatus disclosed, three dichroic filters partially intercept a white light beam emerging from a light source. The filters thus divide the beam into a white and an intensely colored portion. The beam enters a mixing chamber through a porthole and strikes a slanted white-opaque ceiling and white-opaque sidewalls which coact to mix the white and intensely colored light. The light exits through a diffuser at the bottom of the chamber so that it can be used to illuminate a color negative in a color enlarger which focuses light on printing paper. The diffuser at the exit of the chamber has a central portion near the center of the exit and an outer portion closer to the margins of the exit, the center portion having a greater diffusion power than the outer portion. According to one embodiment the diffuser is thicker at the center and tapers outwardly toward thin edges. A coloring member closer to the outer portion and extending along the outer portion imparts a color to the light near the outer portion which compensates for color intensity imparted by the center portion of the diffuser.

35 Claims, 20 Drawing Figures

COLOR CORRECTING ILLUMINATION SYSTEM FOR COLOR ENLARGERS AND THE LIKE

BACKGROUND OF THE INVENTION

This invention relates to light coloring apparatuses, and particularly to apparatuses for producing desired chromaticities and saturations of light to be used in photographic color enlarging apparatuses. The invention also relates to photographic color enlarging apparatuses.

In such enlarging apparatuses light is passed through a color film, such as a color negative or a color slide, whose image is to be printed, and an optical system focuses the light passed through the film onto color printing paper. It is often necessary to color the light passed through the film to compensate for the color balance of the film, the paper, and the light source. The light across the film should be substantially uniform in chromaticity, saturation and intensity. It is also desirable that the chromaticity and saturation be accurately adjustable. Furthermore, it is desirable that the light be used as efficiently as possible.

According to the prior art, this has been done by intercepting a portion of a white light beam with three color filters. These three filters then color that portion of the beam that each intercepts. The rest of the beam remains white. The colored portion of the beam is then mixed with the white portion. The respective amount that each filter intercepts the beam relative to each other filter, determines the overall color balance or chromaticity of the beam. On the other hand, the average or overall interception by all three filters determines the overall saturation. The mixing of the portions of the beam is done in a mixing chamber. There the light is bounced off the walls of the chamber and leaves through a diffuser that directs the light towards the film which is mounted in a film carrier. From there the optical system of the enlarger focuses the image of the film onto the color printing paper.

In order to assure that the light emerging from the optical system is spread with uniform intensity over the entire surface of the printing paper, the diffuser is given a greater diffusing power at the center than at the edges of the exit. This compensates for the larger distance from the focus of the optical system to the center of the printing paper as compared to the edges of the printing paper. Preferably the diffuser constitutes a plate having a given thickness at a center portion and becoming progressively thinner towards the outer portion. The diffuser's center portion diffuses more of the light back into the mixing chamber thereby reducing the "hot spot" of the central light beam.

It has been discovered that despite all these efforts at obtaining uniformity and color balance, that resulting prints exhibit a slight color nonuniformity.

An object of the invention is to improve color illuminating systems.

Another object of the invention is to improve color enlargers.

Still another object of the invention is to eliminate the aforementioned problems.

SUMMARY OF THE INVENTION

According to a feature of the invention, these objects are attained, in whole or in part by locating coloring means in the chamber means for imparting a color change to light emerging from the chamber, the color means being sufficiently further from one diffuser portion than another to impart a greater color change to the one portion than the other portion.

According to another feature the chamber has one section in which colors are mixed less effectively than other parts of the chamber. The coloring means are located in that section According to another feature the section is near the exit. According to another it is at the outer diffuser portion.

According to another feature of the invention, the one portion is the center portion and the other the outer portion.

According to another feature of the invention the sidewalls of the chamber surround the exit and the coloring means inlcude a color strip extending along the sidewalls and the exit close enough to the exit to impart a greater color change to the outer diffuser portion than to the center portion.

According to another feature of the invention, the exit is in the form of a window which defines a plane and the strip has a width extending substantially transverse to the plane.

According to yet another feature of the invention, the exit is in the form of a window which defines a plane and the strip has a width extending substantially parallel to the plane.

According to yet another feature of the invention, the mixing chamber has a section closer to the outer portion than the center portion at which colors are mixed less effectively than the center portion of the chamber, and the coloring means are located in that section.

According to yet another feature of the invention the section surrounds the window.

According to still another feature of the invention the strip is in the form of a color filter.

According to yet another feature of the invention the coloring means includes a second strip having a second color which together with the color of the first strip compensates for the undesirable effect.

The invention is based upon the discovery that the diffuser imparts a color characteristic to the light emerging therefrom and that this color characteristic is nonuniform because of the nonuniform diffusion characteristic of the diffuser. It is also based upon the discovery that the color characteristic imparted is composed of two components of the filters being used.

Thus, according to another feature of the invention the color means includes one color corresponding to the more significant of the color components.

According to yet another feature of the invention the color means includes colors of both components in the proportion of their significance.

According to yet another feature of the invention the coloring means is composed of two color strips each corresponding to a component and having widths or densities proportional to the component significances.

These and other features of the invention are pointed out in the claims. Other objects and advantages of the invention will become evident from the following detailed description when read in light of the accompanying drawings.

DESCRIPTION OF PREFERRED EMBODIMENTS

Figures 1, 2, 3, 5, 6, 7:
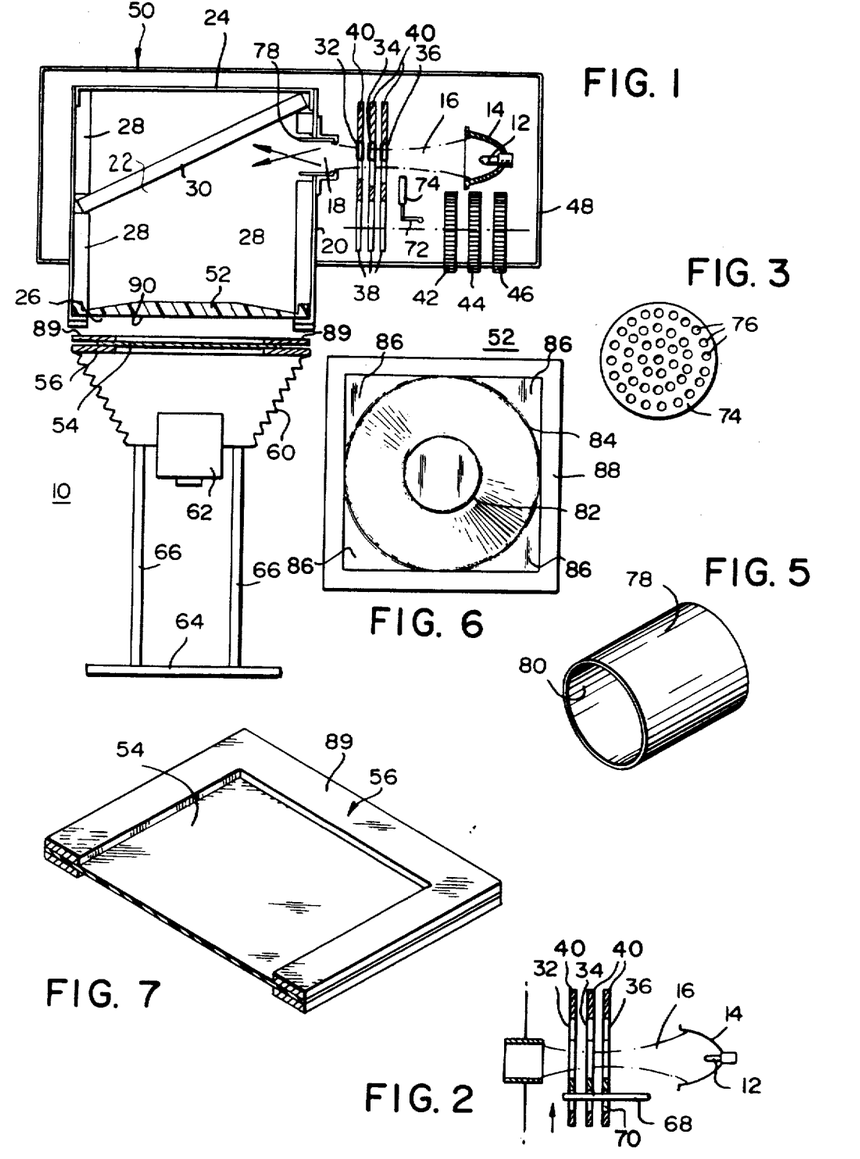
FIG. 1 is a somewhat schematic sectional elevation of an enlarger embodying features of the invention.
FIG. 2 is a schematic illustration of a portion of FIG. 1 with filters moved out of the path of a light beam.
FIG. 3 is a drawing illustrating an attenuator of the enlarger in FIG. 1.
FIG. 5 is a perspective view of a cylindrical mirror in FIG. 1.
FIG. 6 is a plan view of a diffusing plate used in FIG. 1.
FIG. 7 is a perspective view of a film carrier forming a part of FIG. 1.

In the enlarging apparatus 10 of FIG. 1, a light source 12, together with a substantially elliptical reflector 14, directs a light beam toward the entrance port 18 of the port wall 20 in mixing chamber 22. The mixing chamber is generally composed of a metal shell 24 having an exit opening 26 extending virtually across the bottom. Solid white expanded foam panels 28 line the front and side walls of the chamber while a ceiling or roof panel 30 extends angularly upward from the far end of the chamber toward the closer end. The ceiling panel intercepts the light beam entering the entrance port 18 so as to form a hyperbolic section of the beam.

Three dichroic filters 32, 34 and 36 intercept a portion of the beam so as to impart an intense color to the intercepted portion of the beam. The filters 32, 34, 36 pass the respective subtractive primary colors, cyan, yellow and magneta. Suitable cams 38 move respective filter holders 40 so that each filter 32, 34 and 36 intercepts a portion of the beam determined by the rotary position of the cam 38 engaging its holder 40. Each of the filters 32, 34 and 36 may then intercept different proportions of the beam 16. Suitable knurled wheels 42, 44 and 46 extending through the housing 48 of the overall light mixer 50 are each coupled to one of the cams 38. Thus, an operator may set the intercept proportion of the filter 32 by turning the wheel 46 to a particular position. A digital indicator, not shown, apprises the operator of the extent to which the wheel 46 has been turned, and hence the extent to which the filter 32 intercepts the beam 16. Similarly, digital indicators coupled to the wheels 44 and 42, indicate the extent to which these wheels have been turned and the corresponding extent to which the filters 34 and 36 enter the beam 16. The cams 38 and the wheels 42, 44 and 46 are coaxial with each other and coupled by coaxially surrounding shafts (not shown).

Within the chamber 22, the opaque ceiling panel 30, composed of a white hardened foam material disperses the partly colored beam in all directions. Together with the remaining panels 28, each of which corresponds to the panel 30, it bounces the light back and forth in all directions. Ultimately, the panels 28 and 30 mix the white portion of the beam with the colored portion so as to achieve a saturation dependent upon the overall degree to which the filters 32, 34 and 36 extend into the beam. The color of the resulting light, the factor often called chromaticity, is determined by the degree to which each filter extends into the beam relative to the other filters.

The dispersed and mixed light leaves the chamber through a translucent opal diffusion or scattering plate 52 in the exit opening 26 so that it can illuminate an interchangeable color negative or slide 54 mounted in a removable film carrier 56. The plate 52 diffuses the light as it passes through. The diffused light is then passed from the negative 54 through adjustable bellows 60 to an adjustable objective 62. The latter focuses the light as modified by the negative upon printing paper (not shown) mounted on a paper carrier 64.

Suitable racks 66 support the upper projection portion of the enlarger 10 above the paper carrier. In the usual manner, the position of the projection portion of the enlarger is adjustable on the racks 66 by means of pinions for up and down movement. This adjusts the size of the image being focused upon the printing paper in the print carrier 64. The housing 50 can be removed from the enlarger for servicing and adjusting.

An arm 68 passing loosely through opening 70 in the holders 40 can be operated from outside the housing 48 to withdraw all the filters simultaneously from the positions shown in FIG. 1, out of the beam 16, and into the positions shown in FIG. 2. This allows uncolored white light from the source 12 and the reflector 14 to illuminate the negative 54. The wheels 42, 44 and 46 can only move one filter at a time with the cam 38.

Figure 4:
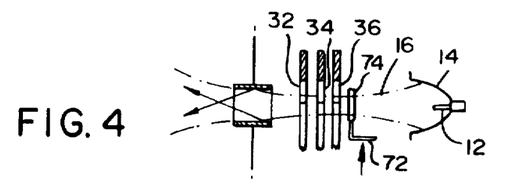
FIG. 4 is a schematic illustration showing the attenuator of FIG. 3 in the path of the beam of FIG. 1.

Moreover, an arm 72, operable from outside the housing 50, can move a light attenuator 74, such as shown in FIG. 3, from the position shown in FIG. 1, to the position shown in FIG. 4. The light attenuator is composed of a metal plate having a plurality of evenly distributed light perforations 76. When moved into the position shown in FIG. 4, the light attenuator reduces the overall intensity of the light beam emerging from the source 12 and reflector 14. It thus dims the illumination of the negative 54 and the image on the paper in the carrier 64.

The source and the reflector make the beam converge to a narrow waist or focus and then diverge as shown in FIGS. 1 to 3. The filters are located to intercept the beam at the waist, that is the narrowest portion of the beam. The beam thereafter diverges as it enters the chamber 22. As the diverging light beam 16 passes through the entrance port 18, a cylindrical mirror 78 having an interior reflecting surface 80 reflects the outer margin of the beam diagonally across the beam. In this way, the light from one side of the beam now passes to the other side. Thus, the colored portion of the beam is reflected to the white portion and the white portion toward the colored portion. This greatly improves the mixing process within the mixing chamber.

The translucent diffusion plate 52 at the bottom exit 26 tapers outwardly from a thick circular center 82 toward a thin circular rim 84 as shown in FIGS. 1 and 6.

From the circular rim 84, the material remains thin at the corner margins 86 toward a thickened, square, support frame 88. The entire plate is monolithic and composed of a diffusing or scattering material. The diffusion plate exhibits a variable degree of diffusion, that is, the diffusion is greater at the center and gradually tapers off towards the rim 84. The diffusion plate is constructed by molding or machining a material which has a diffusion characteristic that is a function of its thickness. Therefore, increasing the thickness increases the diffusion. To obtain the desired effect, it is then only necessary to produce a greater thickness at the center than toward the edges. According to one embodiment of the invention, an acrylic resin with minute reflective particles in suspension is used. Such a material has the desired characteristics of increasing diffusion with thickness.

Since it is the property of a diffuser to scatter in all directions each ray of light impinging upon it, and the amount of scattering is related to the amount of diffusion, it follows that the variable diffusion plate 52 will scatter more of its light at the center and transmit more at its edges. As a result, more light is transmitted at the edges and less at the center.

This selective transmission at the edges as compared to the center has the effect of compensating for the fall-off in intensity from the center to the edges experienced when using a uniform diffuser. This had resulted from the cosine law fall-off occurring from the center of the light beam toward the edges because the beam edges travel further to the enlarging paper.

Another advantage of the diffusion plate 52 is that some of the scattered light returns to the chamber while the remaining light passes through the diffuser. This effect is very desirable because a large percentage of the light is scattered back toward the chamber by the center of the diffuser. At the edges, a large amount is transmitted and a smaller amount is reflected back. Aside from producing the uniformity, it increases efficiency, because when the light is reflected back it is re-reflected by the panels or walls of the mixing chamber and eventually passes through the diffuser again. Thus, the total light output of the system is raised significantly.

The bottom surface 90 of the plate 52 has a mate finish. This prevents the plate from excessively reflecting upwardly directed light.

Figure 8:
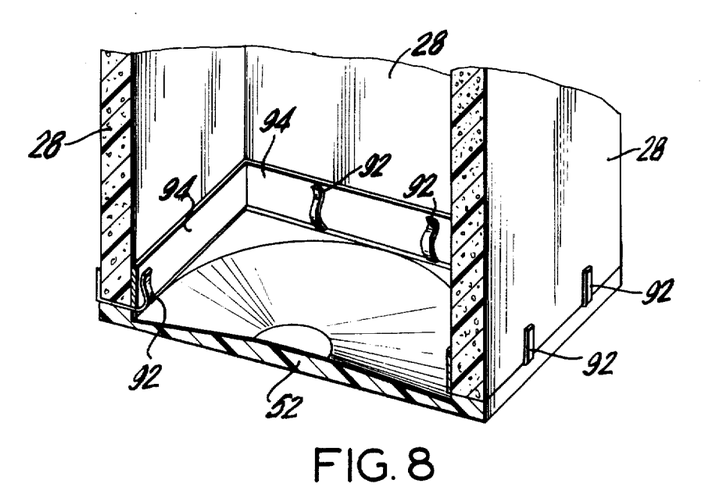
FIG. 8 is a partly sectional perspective view illustrating details of the enlarged in FIG. 1.
Figure 9:
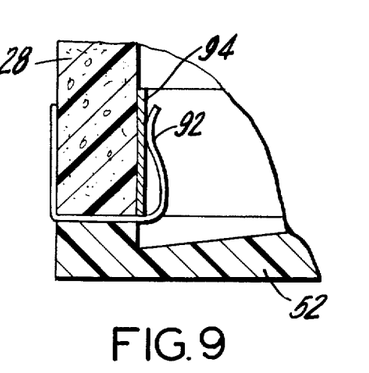
FIG. 9 is a sectional view of a detail of the view in FIG. 8.

As is shown in FIGS. 1, 8, and 9, clips 92 hold a filter or strip 94 of colored transparent filter material against the lower base of the panels 28. The strip 94 extends completely about the periphery of the base of the panels 28 and the periphery of the diffusion plate 52.

This narrow colored strip 94 colors the beam more in the periphery of the diffusion plate than in the center. This is so because it has been discovered that the mixing efficiency of the chamber is comparatively poor in this bottom peripheral portion, and the narrow strip tends to confine the coloring of the beam more toward the periphery than the center. Consequently, the center of the beam is less affected by the additional coloring in the outer rays consequently projected by the beam.

According to one embodiment of the invention, the strip 94 is colored yellow and magenta with respective dye transfer dyes. The yellow density is four times the magenta density. According to one embodiment of the invention, the yellow is 0.20 density and the magenta 0.05 density. The yellow and magenta corresponds to the yellow and magenta of the filters 32, 34, and 36. The strip 94 compensates for the color shift which would otherwise occur in professional color prints. The corners of such prints might otherwise be somewhat more yellow and slightly more magenta than desired where color negatives are used.

It has been discovered that the diffusion plate 52, which is made of acrylic with titanium oxide powder mix, is not of a neutral color and, therefore, acts as a variable color filter. Consequently, the color of the light of the center of the beam is somewhat different from the light beam hitting the corners of the projected image. Actual measurements have disclosed that the color fall-off at the edges is approximately 0.08 to 0.1 yellow and 0.02 magenta in density. The strip 94 adds the additional yellow and magenta which would otherwise be available were the plate flat. The strip is colored with dye transfer dyes of suitable densities to compensate for the particular color variation of the plate used. The color densities of these strips is made somewhat greater than the existing color fall-off would require. This is necessary because, while the mixing efficiency of the chamber 22 is comparatively poorer at the bottom than other positions, it is still sufficiently efficient to disperse some of the yellow and magenta being added by multiple reflection. Thus the chamber has the effect of diluting some of the compensating effect. Therefore, the densities are chosen to compensate for the particular color variations of the plate used and the particular environment of the chamber.

According to another embodiment of the invention the strip 94 is colored and given a width sufficient to adjust the color in the right amount to bring the color fall-off to zero. The manual adjustment of the filters of corresponding colors in the filters 32, 34, and 36, to the desired chromaticities and saturations at the print surface automatically takes into account the color offset introduced by the plate 52 and the strip 96.

According to one embodiment of the invention, the strip 94 is composed of a gelatin coated acetate filter with dye transfer dyes. In one embodiment of the invention, the strip 94 is 0.5 inches high, that is, its width is 0.5 inches.

Figure 10:
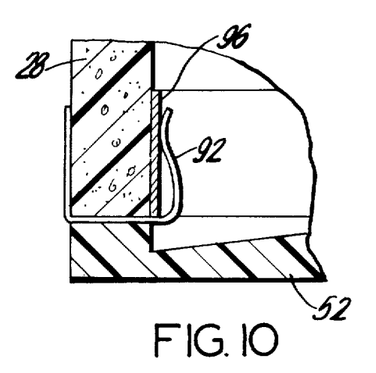
FIGS. 10 and 11 are sectional views of details which when used in FIG. 1 constitute other embodiments of the invention.

According to another embodiment of the invention, the magenta shift is ignored. As shown in FIG. 10, the strip 94 of FIGS. 1, 8, and 9, is replaced with a strip or filter 96 identical thereto except that it is only colored yellow. In most practical cases the magenta coloring can be dispensed with because the magenta color fall-off is not sufficiently great to be noticeable.

Figure 11:
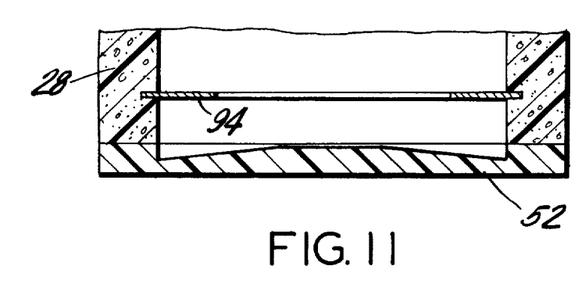
Figure 12:
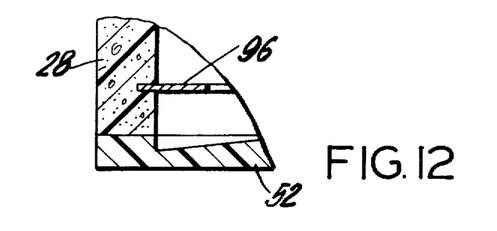
FIGS. 12 to 15 are sectional views illustrating other modifications of FIG. 1 which constitutes other embodiments of the invention.
Figure 13:
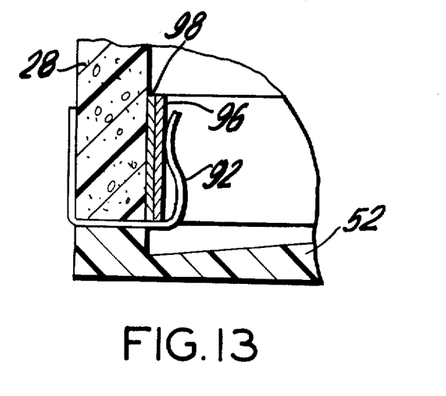

FIG. 11 illustrates still another embodiment of the invention. Here the strip 94 is mounted parallel to the direction of the diffusion plate 52 around the periphery of the chamber near the base of the panels 28. The effect here of the filter 94 is substantially the same as that of the filter 94 in FIGS. 1, 8 and 9. In FIG. 12 the yellow filter 96 replaces the two-colored filter 94 of FIG. 11. In both figures the filters 94 and 96 replace the filters 94 and 96 in FIGS. 1, 8, 9, and 10.

According to another embodiment of the invention, the apparatus of FIG. 1 is altered so that the clips 94 hold two transparent filters 96 and 98 as shown in FIG. 12. Here the filter 96 is yellow and the filter 98 magenta. The sizes of the filters 96 and 98 are identical to the filter 94 and extend completely around the periphery as does the filter 94. The densities of the filters corresponds to that necessary to produce a zero color shift. For example, the filter 96 has four times the density of the filter 98. Specifically, the filter 96 has a density of 0.20 and the filter 98 a density of 0.05. As mentioned, both strips extend completely around the periphery of the base of the panels 28. The effect of the filters 96 and 98 is substantially identical to that of the two-colored filter 94 alone. The positions of the filters relative to each other can be reversed. Thus the filter 96 can be the one closer to the wall.

Figure 14:
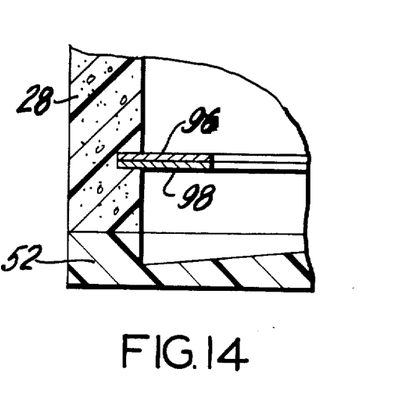

FIG. 14 shows the filters 96 and 98 used together parallel to the diffusion plate 52 in the manner comparable to FIG. 11 in the chamber of FIG. 1.

Figure 15:
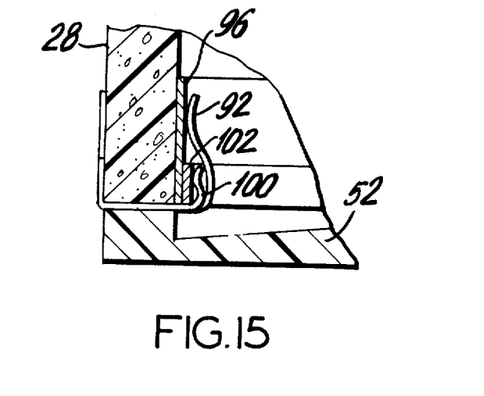
Figure 16:
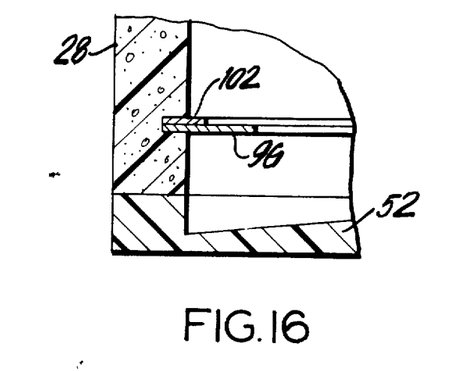
FIGS. 16 to 18 are other sectional details illustrating other modifications which when incorporated in FIG. 1 form other embodiments of the invention.

FIG. 15 illustrates another variation, embodying the invention, of FIG. 1. Here two sets of clips 92 and 100 hold two filters 96 and 102 of equal density against the panels 28 which form the inner walls of the chamber 22. The filter 96 is yellow and the filter 102 is magenta. The filter 96 is 0.5 inches high, (wide) and the filter 102, 0.1 inch high. The effects of the filters 96 and 102 is substantially identical to those of 96 and 98 or 94. FIG. 16 shows the filters 92 and 96 placed horizontal to the panels 28 to achieve the same effect.

In the embodiments of FIGS. 15 and 16, the strips 96 and 102 are given widths sufficient to adjust the color in the right amount to bring the color fall-off to zero.

The manufacture of the strips 96 and 98 is comparatively simple. A gelatin coated film is immersed in a dye transfer dye solution of controlled color and density. It is then dried and inserted into the chamber. Also, acetate color correction filters of adequate density can be used.

Figure 17:
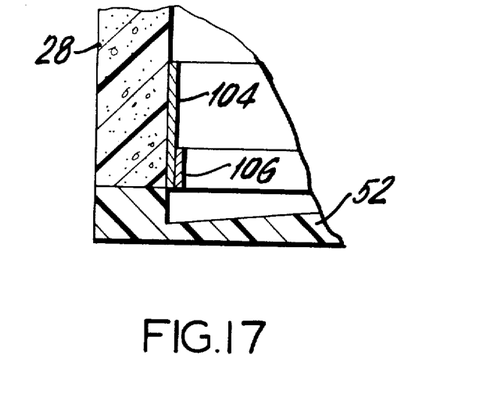
Figure 18:
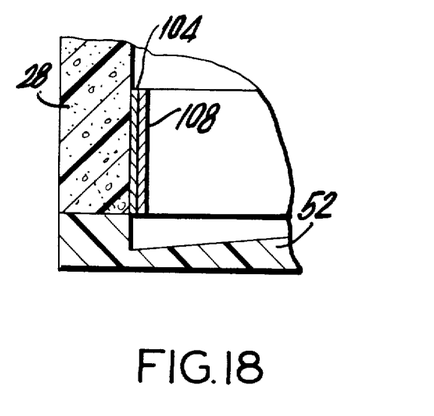

According to another embodiment shown in FIGS. 17 and 18, transparent yellow and magenta colors are painted around the lower bases of the panels 28. The resulting yellow paint layers 104 and magenta paint layers 106 and 108 accomplish purposes similar to that of the previous embodiments. In FIG. 17 the density of the paint layers is the same but their heights vary in accordance with the compensation to be obtained. In FIG. 18 the layer 108 has a density ¼ of that of the layer 104. The layer thicknesses are exaggerated for clarity.

According to an embodiment of the invention, only the layers 104 are used and the layers 106 and 108 are dispensed with.

Figures 19, 20:
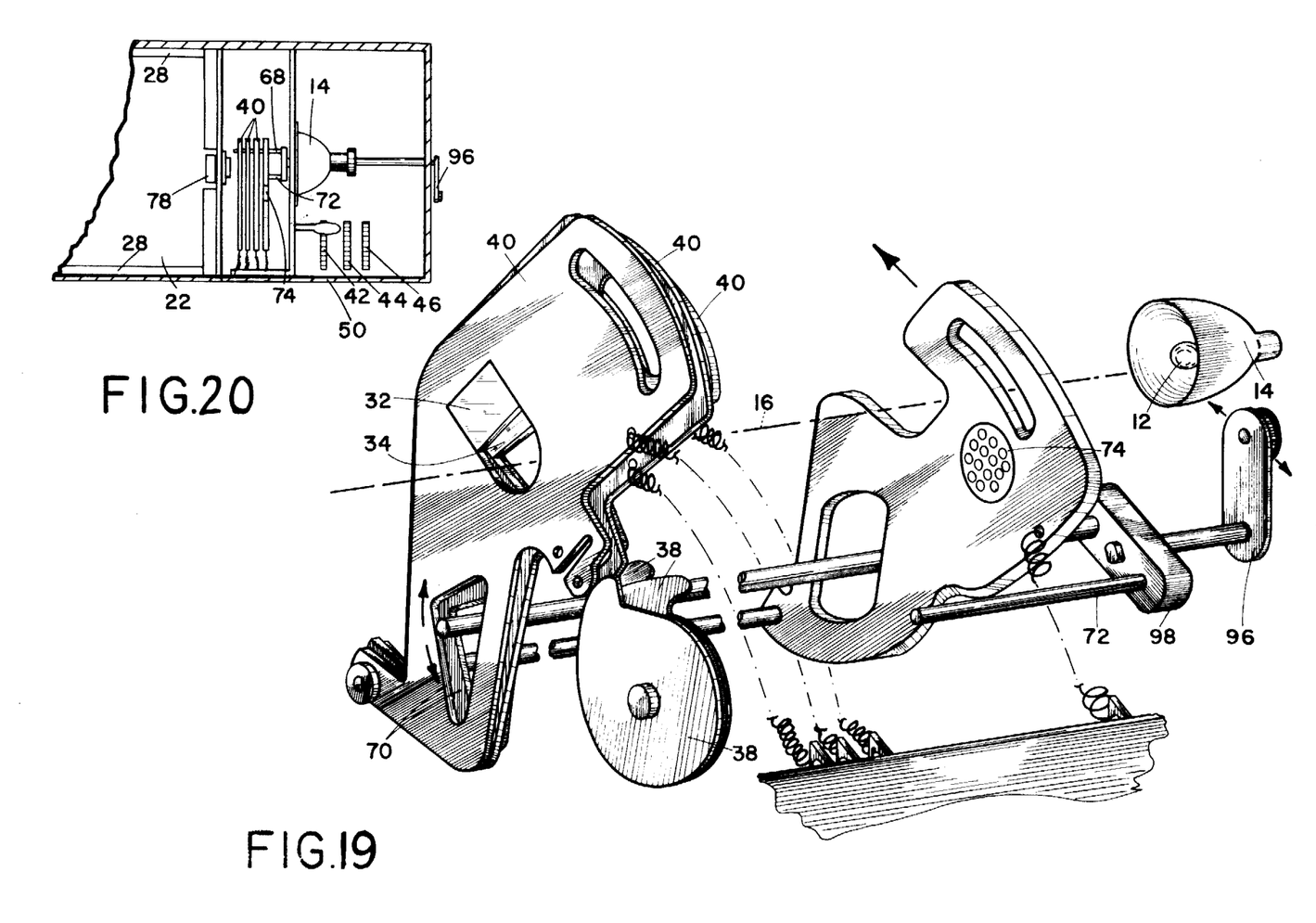
FIG. 19 is an exploded view of a filter control illustrated in FIG. 1.
FIG. 20 is a top or plan view of the structure of FIG. 19 assembled.

FIGS. 19 and 20 illustrate details of the mechanism which moves the filters 32, 34 and 36 in response to the wheels 42, 44, and 46. A lever 104 when turned downwardly moves the arm 72 so that the attenuator 74 enters the light beam. The same lever 104, when moved upwardly causes the arm 68 to drawn the holders 40 and hence the filters 32, 34, and 36 back out of the path of the beam. This allows for a simple means to produce an all-white light, or a dim exposure, with but a single lever.

It can be seen from FIGS. 19 and 20 that the movement of the filters 32, 34, and 36 in FIGS. 1, 2, and 3 is shown somewhat schematically. That is, the filters do not move precisely up and down. Rather, they move angularly.

The term color negative or slide as used herein refers to what is often called a color transparency.

The panels 28 and 30 are composed of expanded foam and exhibit rough white surfaces which disperse or dispersely reflect light impinging thereon. The term diffusion or diffusive reflection has been used to describe this effect. However, dispersion is used to prevent confusion with the diffusion performed by the plate 52.

In use, the source 12 and elliptical reflector focus the beam 16 at about the location of the center filter 34. This forms the waist of the beam. An operator adjusts the wheels 42, 44, and 46 to position the filters 32, 34, and 36 so that they intercept and color predetermined portions of the beam. The cylindrical mirror 78 reflects the colored portion of the beam. The cylindrical mirror 78 reflects the colored portion of the beam into the white and the white into the colored. The thus interspersed light is multiply reflected by the dispersing surfaces of the panels 28 and 30 which scatter the light as it impinges on each surface. The resulting mixed or integrated light (the mixing chamber 22 is often called an integrating chamber) is selectively transmitted by the diffuser 52 to produce a uniform cross-sectional intensity. This objective 562 forcuses the image of the film on the printing paper. The white surface on the carrier 56 reflects the light striking it back toward the chamber 22 while the matte finish on the surface 90 prevents distortion of the uniform intensity and helps increase light gains.

The yellow and magenta colored strips 94, 96, 98, 102, 104, compensate for the color shift between the center and the edges of the light beam introduced by the difference in thickness of the diffusion plate 52 at the center and the edges. As a result the quality of prints from hot-spot-preventing color enlargers is enhanced.

In the drawings, the thicknesses of the strips 94, 96, 102, 104, 98, are in some instances exaggerated for clarity. Nevertheless, in some cases, the strips may actually have the thicknesses shown. The invention may be used for other purposes than those specifically indicated herein. For example, the invention may be used to produce desired color shifts at specific locations on the prints. If the marginal areas of the prints are to be given a color shade different from the center, it is possible to provide this color by placing strips of the complementary color at the locations shown, where negative films are being used. Similarly, if the center is to have imparted to it a particular hue while the marginal color is to be natural, the filters 32, 34, and 36 can be adjusted to achieve this hue while the strips 96 and 98 are colored to compensate for this color shift at the margins.

Also it is not necessary for the strips to extend completely around the periphery of the mixing chamber. In this way specific marginal areas can be corrected or have their colors shifted. The strips 96, 98, and 102 and the layers 104, 106, and 108 can be placed side by side. In that case the layers 104, 106, and 108 can be opaque. Also, a single color layer can be painted in lieu of layers 104, 106, and 108. Moreover, the densities and strip or layer widths can both be adjusted together to achieve zero color fall-off. The colors can be changed for different diffuser materials.

While embodiments of the invention have been described in detail, it will be obvious to those skilled in the art that the invention may be embodied otherwise without departing from its spirit and scope.

What is claimed is:

1. An illuminating system, comprising source means for forming a beam of light, mixing chamber means for receiving the beam, filter means for coloring a part of the beam, said mixing chamber means having opaque reflective dispersing means for mixing the light in said chamber means, said chamber means having an exit window for allowing egress of the light from said chamber means, diffusion means covering the window for diffusing light as it leaves said chamber means, said diffusion means having a plurality of portions, and coloring means located in said chamber means near the window for imparting a color change to light emerging from the chamber, said coloring means being sufficiently closer to one portion of the diffusion means than another portion to impart a greater color change to the one portion than to the other portion.

2. A system as in claim 1, wherein said chamber means includes a section at which colors are mixed less effectively than in other sections of the chamber, said coloring means being located in the section at which colors are mixed less effectively.

3. A system as in claim 1, wherein the one portion is along the periphery of the dispersing means and the other portion is at the center of the dispersing means.

4. A system as in claim 3, wherein said mixing chamber has a section closer to the outer portion than the center portion at which colors are mixed less effectively than in other portions of the chamber, said coloring means being located in the section at which colors are mixed less effectively.

5. A system as in claim 1, wherein the center portion has a greater diffusion power than the outer portion, said diffusion means having a color characteristic for imparting a color change to the light emerging through the egress, the characteristic being greater at said center portion than the outer portion, the coloring means being sufficiently farther from the center portion than the outer portion to impart a greater color change at the outer portion than the center portion and imparting at least a part of the color change imparted by the characteristic.

6. A system as in claim 4, wherein the center portion has a greater diffusion power than the outer portion, said diffusion means having a color characteristic for imparting a color change to the light emerging through the egress, the characteristic being greater at said center portion than the outer portion, the coloring means being sufficiently farther from the center portion than the outer portion to impart a greater color change at the outer portion than the center portion and imparting at least a part of the color change imparted by the characteristic.

7. A system as in claim 5, wherein said diffusion means has a characteristic which imparts a plurality of components of color changes and said coloring means imparts at least one of the components.

8. A system as in claim 6, wherein said filter means colors a part of the beam with a number of color components, said diffusion means having a characteristic which imparts a color change having a plurality of said components, said coloring means imparting one of said components.

9. A system as in claim 6, wherein said filter means colors a part of the beam with a number of color components, said diffusion means having a characteristic which imparts a color change having a plurality of said components, said coloring means imparting two of said components.

10. A system as in claim 5, wherein said coloring means imparts change in the color at the outer portion on the basis of the difference between the inner and outer portion.

11. A system as in claim 1, further comprising projection means positioned outside the chamber means at the egress for projecting light passing through said diffusion means so as to form an enlarger.

12. A system as in claim 11, further comprising film holder means between said diffusion means and said projection means so as to hold film whose images alter the light from said diffusion means and are projected by said projection means.

13. A system as in claim 6, wherein said chamber means includes wall means surrounding the exit window, said coloring means including a color strip having at least part of the color change imparted by the characteristic and extending along the wall means and the window close enough to the window to impart a greater color change to the outer portion than to the center portion.

14. A system as in claim 13, wherein said window defines a plane and said strip has a width extending substantially transverse to the plane.

15. A system as in claim 13, wherein said window defines a plane and said strip has a width extending substantially parallel to the plane.

16. A system as in claim 2, wherein said mixing chamber has a section closer to the outer portion than the center portion at which colors are mixed less effectively than in other portions of the chamber, said coloring means being located in the section.

17. A system as in claim 16, wherein the section surrounds the window.

18. A system as in claim 17, wherein the coloring means includes a strip having at least part of the color change imparted by the characteristic and extends longitudinally along the section.

19. A system as in claim 6, wherein said window defines a plane and said strip has a width extending substantially transverse to the plane.

20. A system as in claim 6, wherein said window defines a plane and said strip has a width extending substantially parallel to the plane.

21. A system as in claim 6, wherein the strip is in the form of a color filter.

22. A system as in claim 21, wherein the strip is in the form of a color filter.

23. A system as in claim 20, wherein the strip is in the form of a color filter.

24. A system as in claim 17, wherein the coloring means includes a second strip having another part of the color change imparted by the characteristic and extends longitudinally along the section.

25. A system as in claim 24, wherein said window defines a plane and said strip has a width extending substantially transverse to the plane.

26. A system as in claim 24, wherein said window defines a plane and said strip has a width extending substantially transverse to the plane.

27. A system as in claim 24, wherein said window defines a plane and said strip has a width extending substantially parallel to the plane.

28. A system as in claim 6, wherein said strip is in the form of paint.

29. A system as in claim 24, wherein said strips are in the form of paint.

30. A system as in claim 7, wherein said coloring means includes a strip imparting two components of the color changes in proportion to their magnitudes.

31. A system as in claim 7, wherein said coloring means includes a strip which imparts the one of the components.

32. A system as in claim 7, wherein said coloring means includes a first strip which imparts the one of the components and a second strip which imparts the other of the components.

33. A system as in claim 32, wherein the widths of the strips vary in accordance with the magnitude of the components.

34. A system as in claim 32, wherein the densities of the strips vary in accordance with the magnitude of the components and the widths of the strips are the same.

35. A system as in claim 33, wherein the densities of the strips are the same.

* * * * *